United States Patent
Serras et al.

(10) Patent No.: US 8,594,849 B2
(45) Date of Patent: Nov. 26, 2013

(54) METHOD AND DEVICE FOR ADJUSTING THE TEMPERATURE AND HYGROMETRY INSIDE A BUILDING

(76) Inventors: Edouard Serras, Neuilly sur Seine (FR); Jean-Marie Gaillard, Limoges (FR)

( * ) Notice: Subject to any disclaimer, the term of this patent is extended or adjusted under 35 U.S.C. 154(b) by 225 days.

(21) Appl. No.: 13/002,237

(22) PCT Filed: Jul. 6, 2009

(86) PCT No.: PCT/FR2009/000834
§ 371 (c)(1),
(2), (4) Date: Mar. 16, 2011

(87) PCT Pub. No.: WO2010/004134
PCT Pub. Date: Jan. 14, 2010

(65) Prior Publication Data
US 2011/0172829 A1 Jul. 14, 2011

(30) Foreign Application Priority Data
Jul. 7, 2008 (FR) ...................................... 08 03847

(51) Int. Cl.
G01M 1/38 (2006.01)
G05B 13/00 (2006.01)
G05B 15/00 (2006.01)
G05D 23/00 (2006.01)
E04H 13/00 (2006.01)

(52) U.S. Cl.
USPC ........... 700/276; 700/277; 700/278; 700/299; 700/300; 52/135; 52/142

(58) Field of Classification Search
USPC ............ 700/276–278, 299–300; 52/135, 142, 52/265; 217/4, 128; 154/14, 17, 28
See application file for complete search history.

(56) References Cited

U.S. PATENT DOCUMENTS

| 2,591,178 | A | * | 4/1952 | McAdam .......................... 62/214 |
| 3,410,336 | A | * | 11/1968 | Eisler .............................. 165/223 |
| 5,239,834 | A | * | 8/1993 | Travers ............................. 62/151 |
| 5,770,295 | A | * | 6/1998 | Alderman .......................... 428/68 |
| 7,913,511 | B2 | * | 3/2011 | Meyer et al. ...................... 62/371 |
| 2007/0094964 | A1 | | 5/2007 | Stender |

(Continued)

FOREIGN PATENT DOCUMENTS

| DE | 200 21 331 | 5/2001 |
| DE | 102 23 896 | 12/2003 |

(Continued)

OTHER PUBLICATIONS

International Search Report for International Application No. PCT/FR2009/000834.

*Primary Examiner* — Ramesh Patel
(74) *Attorney, Agent, or Firm* — Alston & Bird LLP

(57) ABSTRACT

A method and a device for regulating the temperature inside a building having walls that include an inner microporous wall separated from a thermally insulating outer wall by a sheet of air, the device having a data processor configured to drive and control the circulation of outside air between the double walls of the building so as to act as a function of climatic conditions to regulate the temperature and the hygrometry inside the building by evaporating and condensing a fraction of the humidity of the microporous inner wall of the double walls of the building.

7 Claims, 2 Drawing Sheets

(56) References Cited

U.S. PATENT DOCUMENTS

| | | | |
|---|---|---|---|
| 2011/0064784 A1* | 3/2011 | Mullens et al. | 424/443 |
| 2012/0147552 A1* | 6/2012 | Driggers | 361/679.53 |
| 2013/0040551 A1* | 2/2013 | Serras | 454/258 |

FOREIGN PATENT DOCUMENTS

| | | |
|---|---|---|
| EP | 0 097 361 | 1/1984 |
| JP | 57-84944 | 5/1982 |
| JP | 4-320734 | 11/1992 |

* cited by examiner

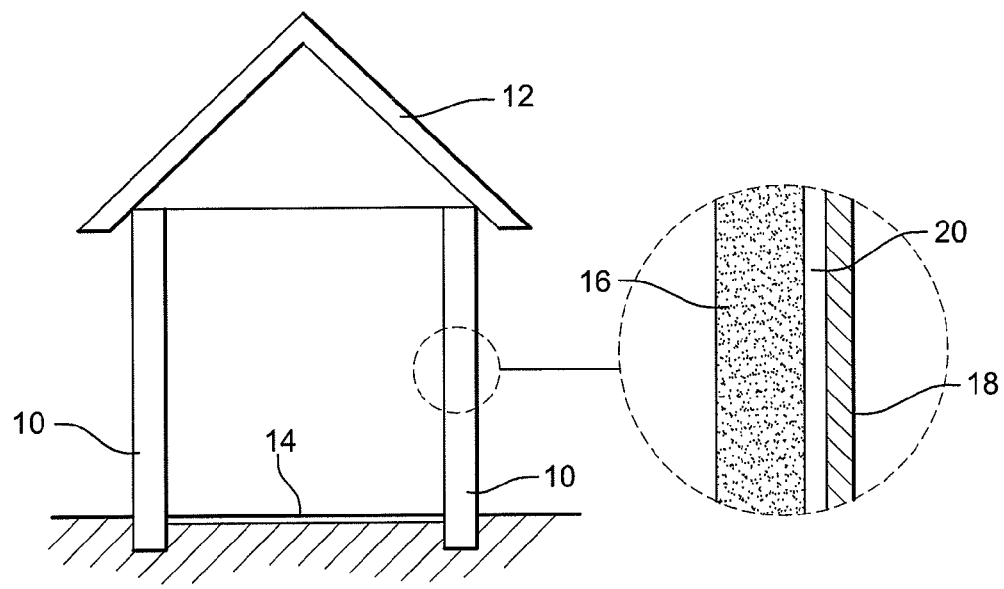
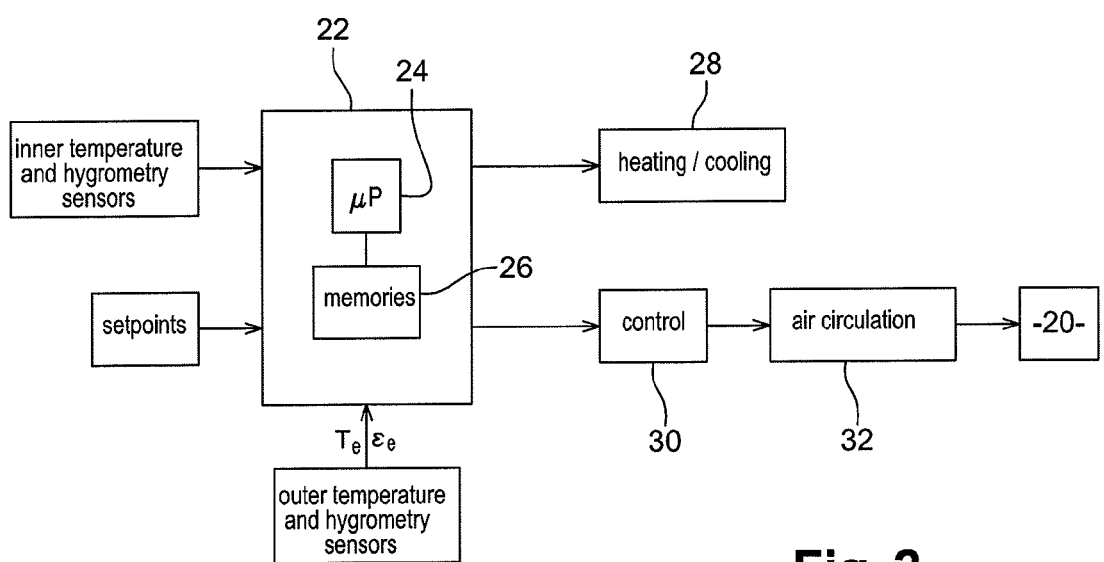
Fig. 1
Fig. 2

METHOD AND DEVICE FOR ADJUSTING THE TEMPERATURE AND HYGROMETRY INSIDE A BUILDING

FIELD OF THE INVENTION

The invention relates to a method and a device for regulating temperature and hygrometry inside a building.

BACKGROUND OF THE INVENTION

In order to reduce energy consumption for heating and air-conditioning a building, attempts have been made in the past to limit heat losses through the roof, through the walls, and through the floors of the building, in combination with using solar energy heater means, heat pumps, and/or other types of heater or cooler means that are energy-efficient and/or that make use of renewable energy.

Proposals have been made in particular for a novel type of building in which the outside walls are double walls (or "cavity" walls), comprising a load-carrying inner wall (or "wythe") and a thermally insulating outer wall, these walls being separated by an intermediate space in which it is possible to circulate air that is taken from outside the building so that, at certain times of day or night, the inner wall can be heated or cooled as a function of requirements, while also taking account of the orientation and the insolation of the walls in question.

SUMMARY OF THE INVENTION

A particular object of the present invention is to provide a method and a device for regulating the temperature of a building of this type, serving to further increase energy savings for heating and cooling the building, and also making it possible to control the hygrometry inside the building.

To this end, the invention provides a method of regulating the temperature inside a building having outside walls that are double, comprising two walls separated by an internal space in which it is possible to circulate air taken from outside the building, characterized in that, for the outside walls having inner walls that are microporous and outer walls that are thermally insulating, the method consists in:

- measuring or estimating the temperature of the outside air and its hygrometry, and also the variations thereof during the day and during the night over the seasons; and
- determining the periods of day and night during which circulating outside air between the two walls of a double wall can best cool or heat the inner wall of the wall as a function of requirements, taking account of the hygrometry of the outside air, the hygrometry of the air in contact with the porous wall inside the building, and the variations in the temperature and the humidity of the porous wall.

The method of the invention enables the temperature inside the building to be controlled by taking account not only of the temperature difference between the inside and the outside of the building, but also of the hygrometry of the air inside the building and the hygrometry of the air outside the building, making use of the latent heats of evaporation and of condensation of the humidity of the outside air and of the moisture contained in the porous walls of the walls, the invention also making it possible to set the hygrometry of the air inside the building to improve the feeling of comfort in the building, both in summer and in winter, and to do this while reducing the amount of energy that needs to be consumed for heating or air-conditioning the building.

The method of the invention also consists in selecting the outside wall(s) in which outside air is to be made to circulate as a function of the orientation(s) and of the insolation(s) thereof and of the different temperatures desired in the dwelling zones.

More precisely, the method of the invention consists, in summer or in hot and dry weather, in causing outside air at relatively low hygrometry to circulate in the space between the two walls of a double wall so as to cool the porous inner wall of the wall by evaporating its moisture, thereby cooling the air inside the building that is in contact with said porous wall and reducing the hygrometry of said air inside the building.

It is thus possible to maintain the temperature and the hygrometry of the air inside the building at optimally comfortable values, while consuming less energy than in the prior art.

The method of the invention also consists, in winter or in cold and wet weather, in causing cold outside air to circulate in the space between the two walls of a double wall under conditions that heat the inner wall of the wall by condensing moisture and that increase the hygrometry of the air inside the building that is in contact with said porous wall.

In general manner, the energy-saving provided by the invention in terms of consumption for heating and cooling the building is about 50% to 90% depending on the region and on the thickness of the inner wall, all other conditions remaining equal, with this saving being due to the condensation and the absorption by the porous wall of a fraction of the humidity of the outside air that flows over said porous wall (when heating), or to evaporating a fraction of the moisture from the porous wall (when cooling).

The invention also provides a device for regulating the temperature inside a building that has double-walled outside walls and means for circulating air taken from the outside in the space between the two walls of the outside walls, the device being characterized in that, for the outside walls having inner walls that are porous walls and outer walls that are thermally insulating walls, the device comprises means for measuring or estimating the temperature and the hygrometry of the air outside the building together with the variations thereof during the day and during the night over the seasons, calculation means for responding to the real outside temperatures and hygrometries, to the temperatures and hygrometries desired inside the building, and to the capillarity and the thickness of the porous wall, to determine the period(s) of the day or of the night during which outside air is to be caused to circulate between the two walls of the walls, and the duration(s) of said period(s), in order to obtain the temperature and the hygrometry desired inside the building, the calculation means being designed to drive means for controlling the circulation of outside air between the two walls of the outside walls of the building.

The above-mentioned calculation means also comprise means for estimating any additional energy that needs to be supplied in order to obtain the desired temperature inside the building, these calculation means being designed to control corresponding heater or cooler means in the building.

In this device, the air circulation means are controlled, in summer or in hot and dry weather, to cause the hot outside air to pass between the two walls of an outside wall under conditions that cause moisture to evaporate from the porous wall of the wall, thereby cooling said wall and absorbing humidity from the air inside the building that is in contact with said porous wall.

The air circulation means are also controlled, in winter or in cold and wet weather, to cause the cold outside air to pass between the two walls of an outside wall under conditions that give rise to the porous wall heating by condensation, to an increase in the moisture of said wall, and to an increase in the hygrometry of the air that is inside the building and in contact with said porous wall.

It is also advantageous for thermal barriers to be provided between the outside walls, the foundations, and a ceiling under the roof, and also around openings in the outside walls such as doors and windows.

The presence of the porous wall in the outside walls of a building, combined with the presence of a sheet of air between said porous wall and a thermally insulating outer wall, makes it possible to achieve a reduction of about 75% in the amount of energy that needs to be consumed for heating and cooling the building compared with the prior art, with it being possible for such heating and cooling to be performed without consuming energy while benefiting from the most favourable of outside temperature and humidity conditions. The risk of mold developing is also eliminated by preventing the walls reaching dew-point temperatures.

BRIEF DESCRIPTION OF THE DRAWINGS

The invention can be better understood and other characteristics, details and advantages thereof appear more clearly on reading the following description, made by way of example with reference to the accompanying drawings, in which:

FIG. 1 is a diagrammatic section view of a building of the invention;

FIG. 2 is a diagram of a temperature regulation device of the invention; and

DETAILED DESCRIPTION OF THE INVENTION

Figure 3:
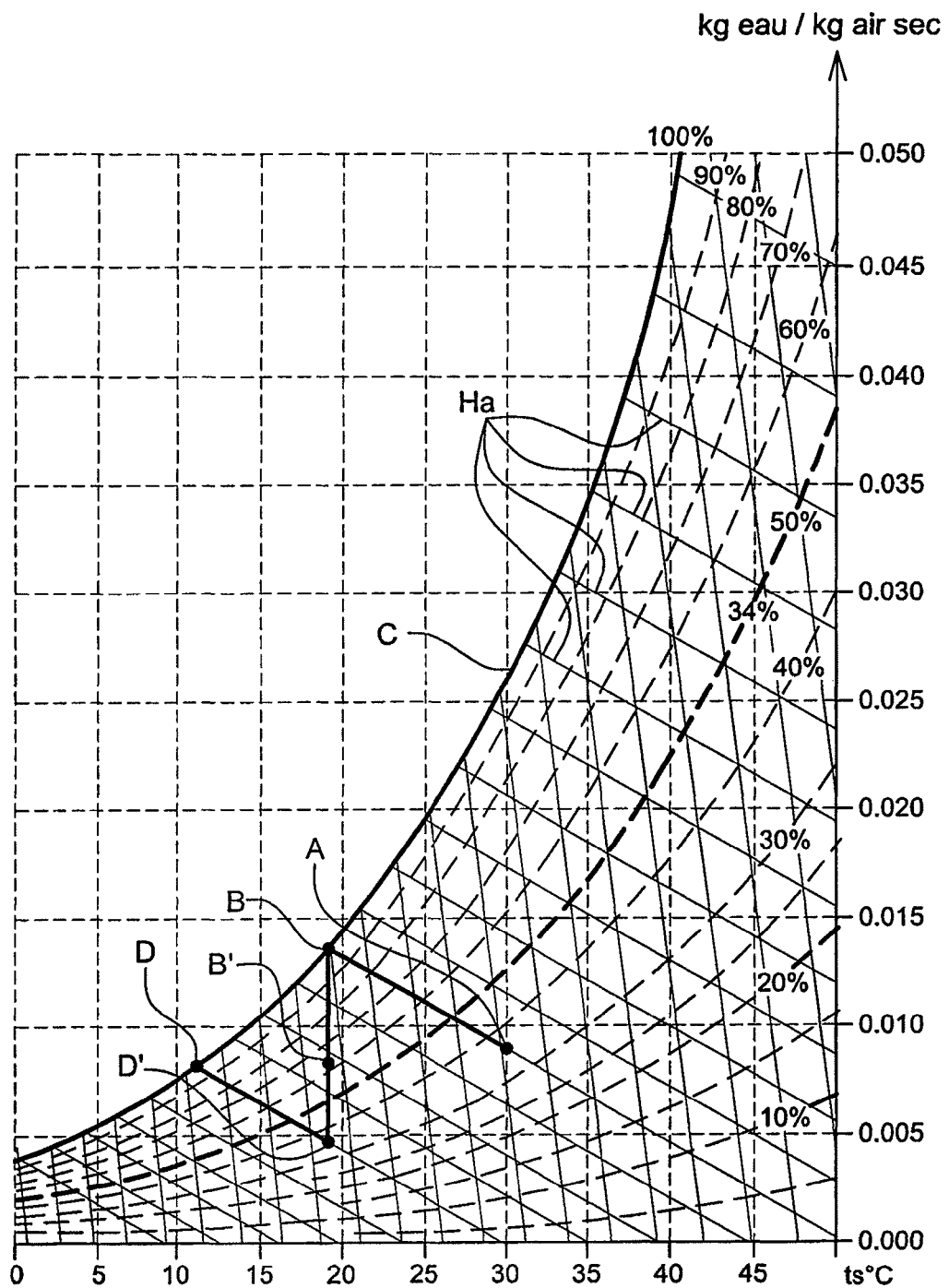
FIG. 3 is a Véron chart for moist air, and suitable for illustrating the operation of the invention.

Reference is made initially to FIG. 1, which is a highly diagrammatic view of a building of the invention, comprising outside walls 10, a roof 12, and one or more floors 14.

In very general manner, in the prior art, the walls 10, the roof 12, and the floors 14 are designed to reduce heat losses as much as possible, which heat losses nevertheless represent at least 70% of the energy consumed for heating or cooling the building.

An essential object of the invention is to reduce annual energy consumption by at least 75%, by the means that are described below.

In a first aspect of the invention, the outside walls 10 of the building have a double-walled structure, comprising an inner wall 16 that is microporous to moisture and impermeable to air, a thermally insulating outer wall 18, and a sheet of air 20 between the walls 16 and 18.

The microporous inner wall 16 may also be load-carrying, as is the insulating outer wall 18.

In a nonlimiting embodiment of the invention, the inner wall 16 may present a thickness of about 10 centimeters (cm) to 50 cm, the intermediate sheet of air 20 may have a thickness lying the range 2 cm to 5 cm, and the insulating outer wall 18 may have a thickness lying the range 5 cm to 15 cm approximately.

The inner wall 16 has a permeable microporous structure with open capillaries that, in the context of the invention, generally have diameters lying in the range about 0.01 micrometers (µm) to about 10 µm. The distribution of capillary diameters and of the surface electrostatic potentials of the microporous wall allow moisture to condense and be absorbed by the capillaries of small diameter, while the capillaries of larger diameter serve to defuse moisture through the microporous wall. This wall may be made of numerous materials, in particular of plaster or of terracotta (bricks), quarry stones, blocks of hemp mortar, wood, etc.

The space between the walls 16 and 18, which constitutes the sheet of air, is a closed space, in which it is possible to cause outside air to circulate, either by natural convection, or by forced convection by means of fans, and it is fitted with air inlet and outlet means including valves or the like that are normally closed and that are controlled by the regulator device of the invention. The outside air circulates in the space 20 by natural upward convection when its temperature is lower than the temperature of the porous wall, or downwards when it is temperature is higher than the temperature of the porous wall.

The outer wall 18 is thermally insulating and is made of any suitable material. Thermal barriers (layers of thermally insulating material) are installed between the walls 10 and the foundations, between these walls and a ceiling under the roof, and around the openings in the walls (doors, windows . . . ) in order to reduce and prevent as much as possible any exchange of heat via these zones.

The temperature regulation device of the invention is shown diagrammatically in FIG. 2 and essentially comprises data processor means 22 having a microprocessor 24 and memories 26 that are designed to control firstly the means 28 for heating and cooling the building, e.g. comprising a controlled mechanical fan unit having a reversible heat pump, and secondly control means 30 for controlling means 32 for circulating outside air in the intermediate spaces 20 between the walls 16 and 18 constituting the doubled-walled outside walls of the building. Sensors of suitable type serve to measure the temperatures Ti and Te, and the hygrometries $\epsilon i$ and $\epsilon e$, inside and outside the building, and to apply corresponding signals to the data processor means 22 that compare them with temperature and hygrometry setpoints Tc and $\epsilon c$.

Data corresponding to daytime and nighttime variations in the temperature and the hygrometry of the outside air, and data corresponding to their seasonal variations, is recorded in the memories 26 of the processor means 22, together with a calculation algorithm making it possible to select, as a function of requirements and of outdoor climate conditions, the outside wall(s) 10 of the building in which outside air is to be caused to circulate and the periods of day and night during which such outside air circulation is to take place, so as to minimize the consumption of heating and cooling energy in the building, in particular while taking account of requirements and of the orientations of the outside walls and their insolation. By way of example, the outside air may be caused to circulate during the hottest hours of the day in order to heat the building and during the coldest hours of the night in order to cool the building, as a function of transfers of heat. Transfers of water serve to lengthen the duration of heating and of cooling by the associated action of evaporation or condensation of moisture.

The outside air circulating in the intermediate space 20 in contact with the porous wall 16 is naturally laden with moisture. The porous wall 16 also contains moisture in the form of retained water held in the capillaries of diameter smaller than the condensation diameter, water vapor mixed with dry air occupying the empty spaces that are not filled with liquid water in the porous wall, and retained water that is adsorbed by the hydrophilic ingredients of the porous wall.

The exchanges of heat between the moist outside air, the porous wall 16, and the air inside the building, and also the corresponding variations of moisture may be determined by means of the Véron moist air chart as shown in FIG. 3.

In this chart, the abscissa axis represents the temperature ts of dry air, the right-hand ordinate axis represents the absolute humidity of the air in kilograms (kg) of water divided by kg of dry air, the curve C is the dew-point curve or moist air saturation curve corresponding to hygrometry of 100% (where hygrometry is expressed as the ratio of the partial pressure of water vapor in moist air divided by the saturation pressure of water vapor at the same temperature), and the dashed line curves, which are substantially geometrically similar to the curve C, corresponded to equilibrium curves for hygrometries of 90%, 80%, 70%, 60%, etc., as marked.

In this chart, cooling at constant vapor pressure is represented by a straight line segment parallel to the abscissa axis and going towards the dew point curve C. Heating at constant vapor pressure is likewise represented by a straight line segment parallel to the abscissa axis and going away from the dew-point curve C. Adiabatic moistenings of air are represented by parallel curves Ha.

In summer or in hot and dry weather, the air taken outside the building may have a temperature of 30° C. (dry temperature) and hygrometry of 35%, which corresponds to point A in the chart of FIG. 3, and to absolute humidity of about 0.009 kg of water per kg of dry air.

If the porous wall 16 is moist, then the air in contact with this wall goes from point A to point B on the chart of FIG. 3, corresponding to an absolute humidity of 0.014 kg of water per kg of dry air. The air can then absorb 0.014-0.009=0.005 kg of water per kg of dry air, this water migrating by capillarity through the wall 16 towards its face being swept by the outside air where it evaporates and cools the outside face of said wall to a temperature that is close to the wet-bulb temperature of the outside air (i.e. of about 19° C. for a dry air temperature of 30° C.)

The porous inner wall 16 is thus maintained at a temperature of about 19° C. with hygrometry of 65% and absolute humidity of 0.009 kg of water per kg of dry air, this absolute humidity also being that of the air inside the building in contact with the porous wall 16.

Under such conditions, the circulation of outside air in the space 20 between the walls 16 and 18 enables the temperature and the humidity of the air inside the building to be reduced, and provides good comfort inside the building, even though the outside temperature is higher than the inside temperature.

In winter or in cold and wet weather, the air taken from outside the building may be at a dry air temperature lying on the range 11° C. to 12° C., for example, with hygrometry of 100%, which corresponds to point D in the chart of FIG. 3, for which the absolute humidity is equal to 0.008 kg of water per kg of dry air. When this outside air circulates in the intermediate space 20 in contact with the porous wall 16 at a temperature of about 20° C. with relative humidity of 60% (point B' in the chart of FIG. 3), corresponding to absolute humidity of 0.009 kg of water per kg of dry air, the air passes from point D to point D', at which the absolute humidity is 0.004 kg of water per kg of dry air and it condenses a quantity of water equal to 0.009-0.004=0.005 kg of water per kg of dry air inside the wall 16 that will thus be heated by the latent heat of condensation, the condensed water migrating by capillarity towards the inside face of the wall 16 to moisten the air inside the building that is in contact with said wall, thereby ensuring good comfort inside the building.

As a function of the temperature and humidity characteristics of the outside air, it is thus possible to circulate the outside air in the intermediate space 20 to heat or to cool the building while also regulating the hygrometry of the air inside the building. If the hygrometry of the outside air is low, the porous wall 16 cools to the wet-bulb temperature of the outside air, which is about 10° C. less than the dry air temperature of said outside air, while also absorbing a fraction of the moisture of the air inside the building.

Conversely, when the temperature of the outside air is lower and its hygrometry is higher, it is possible to heat the porous wall 16 and to increase the hygrometry inside the building, so as to obtain better comfort.

Amongst other features, this makes it possible to use day/night alternation to regulate the temperature and the hygrometry inside a building, while consuming a minimum amount of energy, or indeed without consuming any energy in the presence of the most favourable conditions in terms of temperature and hygrometry, as a function of the season.

It is also possible to make load-carrying inside walls of the building, or cross walls, in the same manner as the outside walls, and to cause outside air to circulate in their intermediate spaces under the same conditions as for the outside walls, so as to increase heating or cooling, and so as to regulate hygrometry inside the building.

The invention claimed is:

1. A method of regulating the temperature inside a building having outside double walled walls, comprising inner walls that are microporous to moisture and impermeable to air and outer walls that are thermally insulating, the inner and outer walls being separated by an intermediate space in which air can circulate, the method comprising:
   in summer or in hot and dry weather, causing outside air that is hot and relatively dry to circulate in the spaces between the inner and outer walls to cool the microporous inner walls by evaporating their moisture, cooling the air inside the building that is in contact with said inner walls, and reducing the hygrometry of said air inside the building, and
   in winter or in cold and wet weather, causing outside air to circulate in the spaces between the inner and outer walls under moisture-condensation conditions, ensuring heating of the inner walls and an increase in the hygrometry of the air inside the building that is in contact with said inner walls.

2. A method according to claim 1, further comprising:
   measuring or estimating the temperature of the outside air and its hygrometry, and also the variations thereof during the day and during the night over the seasons; and
   determining the periods of day and night during which circulating outside air between the inner and outer walls of an outside double wall can best cool or heat the inner wall.

3. A method according to claim 2, further consisting in selecting an outside wall in which the outside air is caused to circulate as a function of the orientation and of the insolation of said outside wall.

4. A device for regulating the temperature inside a building having outside double walled walls comprising inner walls that are microporous to moisture and impervious to air and outer walls that are thermally insulating, the inner and outer walls of an outside wall being separated by an intermediate space in which air can circulate, the device further comprising air circulation means for causing outside air to circulate between the inner and outer walls, wherein the air circulation means are controlled to cause hot outside air to circulate between the inner and outer walls of an outside wall under conditions that give rise to moisture evaporating from the inner wall, to said wall cooling, and to moisture being absorbed from the air inside the building that is in contact with the inner wall, and wherein the air circulation means are controlled to cause cold outside air to pass between the inner and outer walls of an outside wall under conditions giving rise to heating of the inner wall by condensation of moisture, and to an increase in the hygrometry of the air inside the building that is in contact with the inner wall.

5. A device according to claim 4, further including means for selecting the outside walls in which the outside air is caused to circulate as a function of their orientations and of their exposures to the sun.

6. A device according to claim 4, wherein the calculation means comprise means for estimating any additional energy that might need to be supplied in order to obtain a desired temperature inside the building, and heater or cooler means controlled by the calculation means.

7. A device according to claim 4, further comprising means for measuring or estimating the temperature of the outside air and its hygrometry, and also for measuring or estimating variations thereof during the day and the night over the seasons, and calculation means for responding to the real temperatures and hygrometries and to temperatures and hygrometries desired inside the building to determine the period of the day or the night during which outside air is to be caused to circulate between the inner and outer walls of the outside walls, and the duration(s) of said period, in order to obtain a temperature and a hygrometry desired inside the building, and control means for controlling the air circulation means, the control means being driven by the calculation means.

* * * * *